United States Patent [19]

Frommelt

[11] Patent Number: 4,601,142

[45] Date of Patent: Jul. 22, 1986

[54] LOADING DOCK SHELTERS

[75] Inventor: Robert J. Frommelt, Peosta, Iowa

[73] Assignee: Frommelt Industries, Inc., Dubuque, Iowa

[21] Appl. No.: 606,339

[22] Filed: May 2, 1984

[51] Int. Cl.$^4$ ............................................. E04H 14/00
[52] U.S. Cl. .................................................. 52/173 DS
[58] Field of Search .............. 52/173 DS; 49/485, 496

[56] References Cited

U.S. PATENT DOCUMENTS

| Re. 28,391 | 4/1975 | Frommelt et al. | 52/173 DS |
|---|---|---|---|
| 3,181,205 | 5/1965 | Frommelt et al. | 52/173 DS |
| 3,385,001 | 5/1968 | Bordner | 49/498 X |
| 3,391,503 | 7/1968 | O'Neal | 135/117 X |
| 3,500,599 | 3/1970 | Sciolino | 52/173 DS |
| 3,638,667 | 2/1972 | Frommelt et al. | 135/101 X |
| 3,664,075 | 5/1972 | Hazelwood et al. | 52/173 DS |
| 3,772,839 | 11/1973 | Timbers | 52/173 DS |
| 3,883,993 | 5/1975 | Pullan | 49/498 X |
| 3,939,614 | 2/1976 | Frommelt et al. | 52/173 DS X |
| 4,213,279 | 7/1980 | Layne | 52/173 DS |

Primary Examiner—Alfred C. Perham
Assistant Examiner—Jean M. LaKemper
Attorney, Agent, or Firm—Emrich & Dithmar

[57] ABSTRACT

A loading dock shelter of the pad type, which, in normal operation provides a "wrap-around" type of engagement with the rear ends of trucks backed into operative engagement with the loading dock shelter.

13 Claims, 9 Drawing Figures

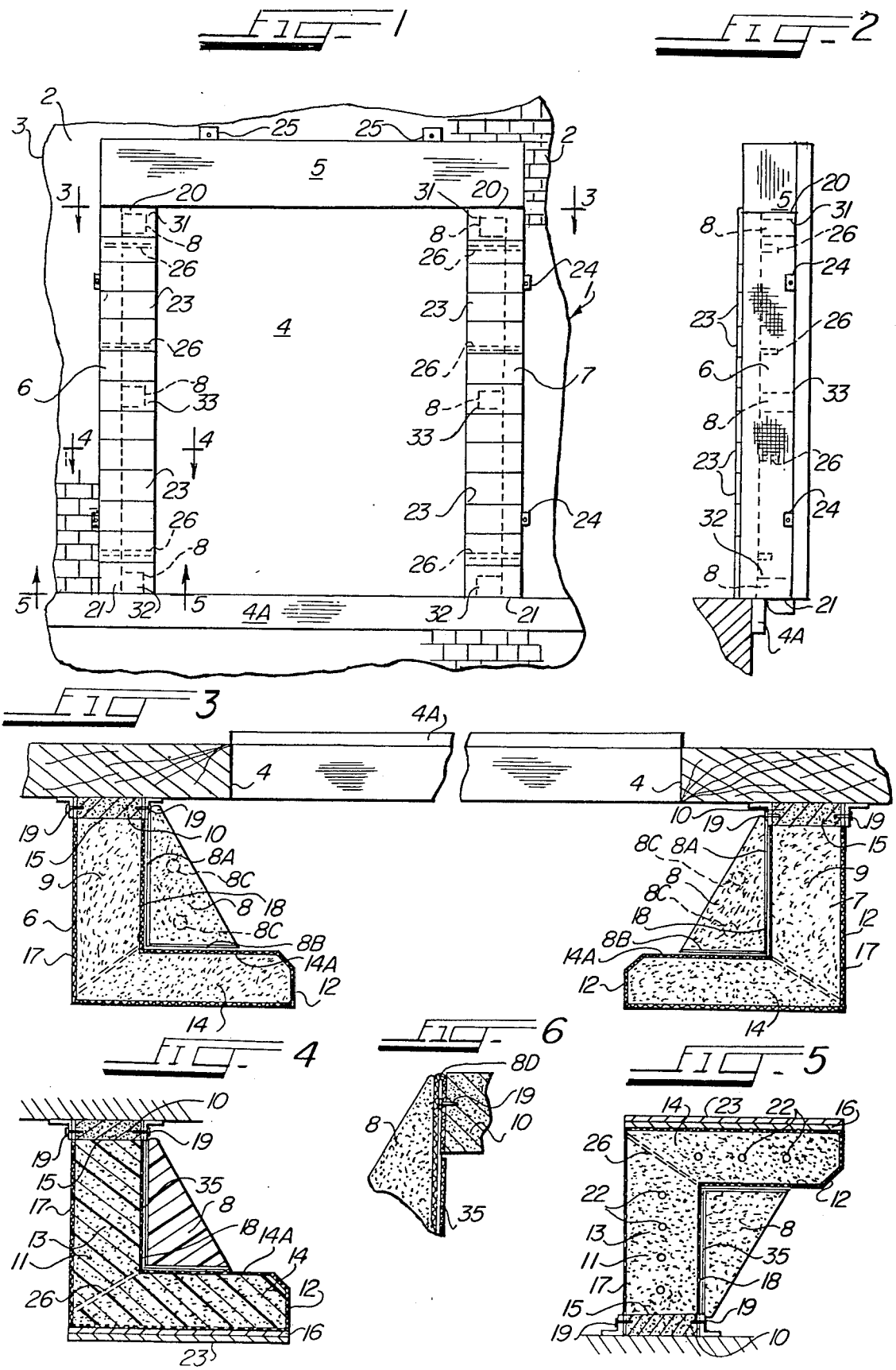

LOADING DOCK SHELTERS

BACKGROUND OF THE INVENTION

The present invention relates to loading dock shelters and, more particularly, to loading dock shelters of the pad type.

It is a primary object of the present invention to provide a novel loading dock shelter.

Loading dock shelters of the pad type have been heretofore known in the art, being shown, for example, in U.S. Pat. No. 3,181,205 issued May 4, 1965 to C. P. Frommelt and S. J. Frommelt and U.S. Pat. No. 3,500,599, issued Mar. 17, 1970, to S. Sciolino. However, such pad type structures have been unable to accommodate trucks of various width while at the same time providing good sealing engagement. Also, loading dock shelters of the curtain type or "drape type" have been heretofore known in the art being shown, for example, in U.S. Pat. No. 3,638,667 and U.S. Pat. No. Re. 28,391, issued Feb. 1, 1972 and Apr. 15, 1975, respectively, to C. P. Frommelt and S. J. Frommelt. In addition, loading dock shelters of the pneumatic type have also heretofore been known in the art, being shown, for example, in U.S. Pat. No. 3,391,503, issued July 9, 1968 to Larry O'Neal and U.S. Pat. No. 3,939,614, issued Feb. 24, 1976 to C. P. Frommelt and S. J. Frommelt. It is an important object of the present invention to afford a novel loading dock shelter of the pad type, which affords improvements over loading dock shelters heretofore known in the art, including loading dock shelters of the aforementioned pad type, "drape type", and pneumatic type.

Another object of the present invention is to provide a novel loading dock shelter of the pad type which is highly effective in affording good sealing engagement with trucks of substantial variations in widths.

A further object of the present invention is to afford a novel loading dock shelter of the pad type which is capable of providing, in a unique and expeditious manner, a "wrap-around" type of engagement with trucks of "normal" widths (as distinguished from "over-size" widths) backed into operative engagement therewith.

An object ancillary to the foregoing objects is to provide a novel loading dock shelter of the aforementioned type which, in operation, affords effective and efficient sealing engagement even with trucks of "over-size" widths backed into operative engagement therewith.

Another object of the present invention is to afford a novel loading dock shelter of the pad type which is practical and efficient in operation and which may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a front elevational view of a loading dock shelter of the pad type embodying the principles of the present invention;

FIG. 2 is a side elevational view of the loading dock shelter shown in FIG. 1;

FIG. 3 is a sectional view taken substantially along the line 3—3 in FIG. 1;

FIG. 4 is a detail sectional view taken substantially along the line 4—4 in FIG. 1;

FIG. 5 is a bottom plan view of a portion of the loading dock shelter shown in FIG. 1, looking in the direction of the arrows 5—5 in FIG. 1;

FIG. 6 is an enlarged plan view of the mounting of the stabilizing wedges of the loading dock shelter in accordance with the present invention.

DESCRIPTION OF THE EMBODIMENT SHOWN HEREIN

Figure 7:
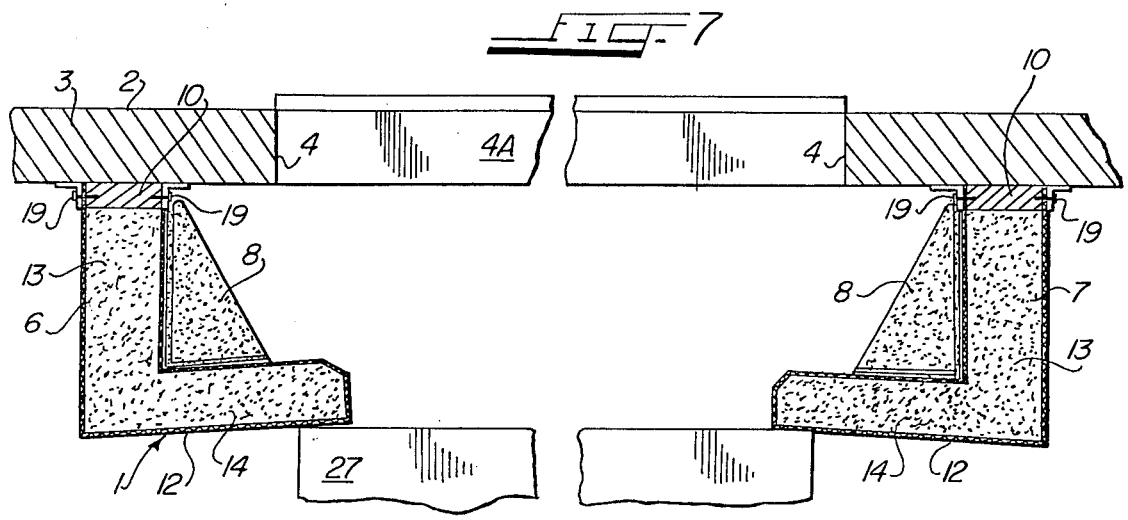
FIG. 7 is a view similar to FIG. 4, with a truck being shown diagrammatically in initial engaging position with the loading dock shelter in accordance with the present invention.

A loading dock shelter 1, embodying the principles of the present invention, is shown in the drawings and illustrates one preferred embodiment of the present invention. It is shown mounted on an outer wall 2, of a warehouse 3 in surrounding relation to a doorway 4 in the warehouse 3, FIG. 1.

The loading dock shelter 1 embodies, in general, a head pad 5 and two oppositely disposed side pads 6 and 7. In operation, the shelter 1 is mounted on the warehouse 3 in such a position that the head pad 5 is disposed above and extends along the doorway 4, and the side pads 6 and 7 are disposed laterally outwardly of, and extend along respective vertical sides of the doorway 4. An elongated bumper 4A is mounted on the warehouse wall 2 below the doorway 4 and the lower ends of the side pads 6 and 7, the bumper 4A projecting outwardly from the warehouse wall 2 and extending along the lower edge of the doorway 4, FIG. 1.

The side pads 6 and 7 are identical in construction, each embodying a pad unit 9 and, in the preferred embodiment of the present invention, a backing member or backing plate 10 on which the pad unit 9 is mounted, as shown in FIG. 3. The backing members 10 may be made of any suitable material, such as, for example, wood or steel, or the like, but, preferably, are made from a suitable wooden material, such as, for example, wood planking.

Each of the pad units 9 is substantially L-shaped in transverse cross-section, and includes a core 11 and a cover member 12, FIG. 4, which extend the full length of the backing member 10. The core 11 may be made of any suitable material, such as, for example, any suitable natural or synthetic compressible, resilient resin or polymer, the preferred material being a foamed polyester. Similarly, the cover or casing 12 may be made of any suitable material, but preferably is made of a flexible, water-repellent, wear resistant material, such as, for example, canvas duck or rubber impregnated nylon fabric.

Both of the pad units 9 are substantially L-shaped in transverse cross-section, each embodying a body portion 13 and a leg portion 14 disposed substantially perpendicularly to each other in the normal, at-rest position of the respective pad unit 9, as shown in FIG. 3. The L-shaped pad units 9 are constructed such that the body portion 13 and leg portion 14 are integral with one another in the sense that the body portion and leg portion are contiguous to one another and define an L-shaped cavity therein which is filled with foam material. Also, it is preferred that the foam material utilized in the construction of the body portion 13 of the pad unit 9 possess a greater density than the foam material utilized in the construction of the leg portion 14 of the pad unit 9 or for the stabilizing wedges 8, for reasons that will hereinafter be described.

Also, it is found that foamed stabilizing wedges 8 are positioned adjacent the L-shaped pad units 9 to provide a stabilizing structure between the body portion 13 and the leg portion 14 of the pad units. Preferably, when the pad unit 9 exceeds approximately 8 feet in height or greater, the wedges 8 are positioned at the top 31 of the pad unit and at the bottom 32 of the pad unit 9 and intermediate the top and bottom at 33, as shown in dotted lines in FIG. 1. However, when the pad unit 9 is less than 8 feet in height, wedges need only be placed at the top and bottom of the pad unit to provide structural stability of the unit after repeated usage. The foamed wedges 8 are preferably mounted to the side walls 18 and 14A of the cover 12 on the pad unit 9 by unitizing a ready attachment means 35 on the edges 8A and 8B, as VELCRO and the like, and include breather vents 8C on the bottom thereof, as shown in dotted lines in FIG. 3. The stabilizing wedges 8 provide structural support for the pad units 9 and return the pad units to their L-shaped configuration after repeated usage of the pad unit 9, as will hereinafter be described in FIGS. 7-9. As shown in FIG. 6, the stabilizing wedges 8 are mounted to the side edges of the respective backing members 10 by a suitable means, such as, nails or screws 19 through a wedge strap 8D.

In each of the side pads 6 and 7, the face of the core 11 of the body portion 13 remote from the leg portion 14 preferably is secured by suitable adhesive, not shown, to one face 15 of the respective backing member 10, in substantially flat juxtaposition thereto.

Each of the covers 12 includes a front wall 16 and two side walls 17 and 18, FIG. 4, with the side wall 17 extending substantially directly rearwardly from one side edge of the front wall 16, and the other side wall 18 extending rearwardly from the other side edge of the front wall 16 in a substantially reverse, laterally disposed Z-shape, FIG. 3. The covers 12 are disposed around the respective cores 11 in snug fitting relation thereto, and the longitudinal edge portions of the side walls 17 and 18 thereof, remote from the respective front walls 16, are secured to the longitudinal side edges of the respective backing members 10 by a suitable means, such as, nails or screws 19. Each of the covers 12 includes also end walls 20 and 21, FIG. 1, closing the top and bottom thereof, respectively. As shown in FIGS. 4 and 5, the wedges are positioned and attached to the cover 12 on leg portion 14 and to the sidewall 18 of the cover adjacent to the end walls 20 and 21. Preferably, the bottom wall 21 has vents 22 therethrough, FIG. 5.

In the preferred form of the loading dock shelter 1, the front wall 16 of the cover 12 of the side pads 6 and 7 thereof includes a plurality of overlapping, flexible, wear-resistant flaps or plates 23, as shown in FIG. 1, stitched or otherwise suitably secured to the underlying fabric of the cover 12 to provide protection against abrasion and tearing of the pad unit 9, in the manner disclosed in greater detail in the aforementioned U.S. Pat. No. 3,181,205. The flaps or plate 23 are attached only at their upper edges to the underlying fabric of the cover 12, and, therefore, each flap or plate 23 is free to move up and down individually of the other flaps, and, because they are flexible, and their sides and bottoms are unattached, they can flex or fold enough to move up and down with an abutting part of the rear of a truck backed into operative engagement with the loading dock shelter 1 to thereby protect the side pads 6 and 7 from wear and tearing.

The side pads 6 and 7 may be mounted in operative position on a warehouse wall, or the like, such as, for example, the wall 2, by any suitable means, but, preferably, are secured thereto by the use of angle brackets 24, having one leg secured to the wall 2 and the other leg thereof secured to a side edge of the respective backing member 10, as shown in FIG. 1.

In the assembled position of the loading dock shelter 1, the side pads 6 and 7 are secured to the wall 2 on respective opposite, lateral sides of the doorway 4, FIG. 3, with the body portions 13 thereof projecting substantially perpendicularly from the wall 2, and with the legs 14 thereof projecting inwardly toward each other from the side portions of the body portions 13 remote from the backing member 10. The head pad 5 preferably is disposed on top of the side pads 6 and 7 and is secured to the warehouse wall 2 by suitable means such as angle brackets 25, a position as shown in FIG. 1. The head pad 5 is substantially rectangular in cross-section and, preferably, projects outwardly from the warehouse wall 2 the same distance as the side pads 6 and 7, FIG. 2.

In the preferred form of the loading dock shelter 1, ties 26, FIGS. 1, 2, 4, which may be made of any suitable material, such as, for example, narrow strips of canvas duck, or the like, extend diagonally across the internal junction between the high density foam material in the body portions 13 and the lower density foam material in the leg portions 14 of the pad units 9, and are secured to the inner face of the respective side walls 17 and 18 to afford reinforcing members for aiding in retaining the rectangular cross-sectional shapes of the body portions 13.

It will be seen that, with this construction, when the loading dock shelter 1 is mounted in operative position on a warehouse wall, or the like such as, for example, the wall 2, the side pads 6 and 7, in their normal, at-rest position, are substantially L-shaped in transverse cross section with the body portions 13 projecting substantially perpendicularly outwardly from the wall 2, and with the leg portions 14 extending inwardly toward each other in substantially uniplanar relation to each other and retained in such a position by the stabilizing wedges 8.

Figure 8:
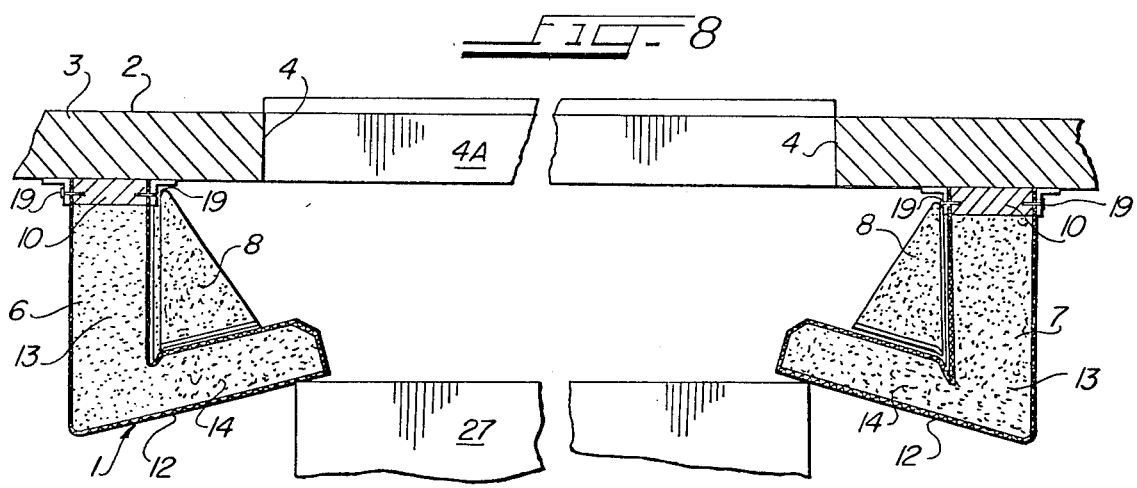
FIGS. 8 and 9 are views similar to FIG. 6 with the truck being shown in progressively further operative engagement with the loading dock shelter in accordance with the present invention.
Figure 9:
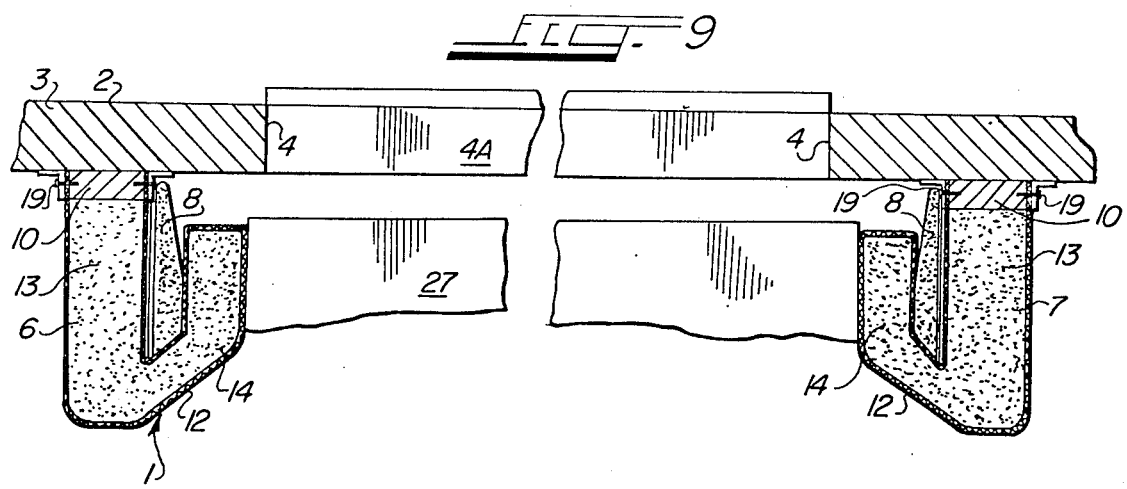

Preferably, the side pads 6 and 7 are so spaced from each other that when a truck of "normal" size, such as the truck 27 shown in FIGS. 7-9, is backed into operative engagement therewith, the sides of the rear of the truck overlap the leg portions 14 a distance greater than the distance between the inner ends of the leg portions 14, and less than the distance between the inner sides of the body portions 13, as shown in FIG. 7. It will be seen that, with this construction, even the initial engagement of the loading dock shelter 1 with the truck 27 affords excellent sealing engagement therebetween. However, as the truck 27 continues to move rearwardly toward the warehouse wall 2, it is effective to cause the leg portions 14, containing the less dense foam material, to bend or flex inwardly around their junctures with the body portions 13, as shown in FIGS. 8 and 9, until, at the innermost position of the truck 27, the leg portions 14 are compressed between the sides of the truck 27 and the body portions 13 of the loading dock pads 6 and 7 with the wedges 8 compressed therebetween, FIG. 9, to afford an effective "wrap-around" type of sealing engagement between the side pads 6 and 7 of the loading dock shelter 1 and the truck 27, with the side pads 6 and 7 disposed completely out of any position in which they would afford an obstruction to ingress or egress into and out of the truck 27 through the doorway 4. After the truck 27 is removed from loading dock shelter 1, the wedges 8 return the leg portions 14 to their substantially uniplanar relation with respect to each other and the body portions 13 to their substantially perpendicular extension from the wall.

However, in addition to affording a non-obstructing highly effecting sealing engagement between the loading dock shelter 1 and the truck 27, it will be seen that the present invention also affords a novel loading dock shelter which is effective with a large variety of truck widths, the shelter 1 affording good sealing engagement with trucks which little more than span the distance between the adjacent faces of the leg portions 14 and trucks of such width that the side walls thereof abuttingly engage the side pads 6 and 7 in alignment with the body portions 13 thereof, in a manner such as that in which trucks compressingly engage pads of the type shown in the aforementioned U.S. Pat. No. 3,557,508.

From the foregoing it will be seen that the present invention affords a novel loading dock shelter which provides effective sealing engagement with trucks moved into operative engagement with the loading dock shelter.

In addition, it will be seen that the present invention affords a novel loading dock shelter which is effective to afford good sealing engagement with trucks of a wide variety of widths.

Also, it will be seen that the present invention affords a novel loading dock shelter wherein, when it is disposed in sealing engagement with trucks of the desired width, highly efficient sealing engagement is effected with such trucks in a manner which affords no obstruction to the passage of people or materials into and out of the rear of the truck.

In addition, it will be seen that the present invention affords a novel loading dock shelter of the pad type wherein, when it is disposed in sealing engagement with trucks of the desired width, highly effective "wrap-around" type of sealing engagement is afforded between the truck and the side pads of the shelter.

Moreover, it will be seen that the present invention provides a novel loading dock shelter of the pad type which is practical and efficient in operation, and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A loading dock shelter for attachment to a wall having a doorway therein, comprising
   a head pad for extending along the top of the doorway in the wall,
   two side pads for extending along the sides of the doorway,
   means for supporting said head pad and said side pads on the wall in outwardly projecting relation thereto, each of said side pads comprising an elongated body portion having upper and lower ends, with said body portion adapted to extend substantially vertically on the wall adjacent to said doorway therein, and an elongated leg portion integral with said body portion and projecting laterally from a portion of said body portion spaced outwardly from the wall in position adapted to extend and project inwardly toward the other of said side pads across a portion of the doorway and extending longitudinally along said body portion substantially throughout the length of the latter and at least two stabilizing wedges attached to said elongated body portion and said elongated leg portion, with each of said wedges positioned at the upper and lower ends of said side pads, and
   a core of compressible resilient material positioned in each of said side pads, with said resilient material in said elongated body portion being of a density greater than the density of said core of compressible resilient material in said elongated leg portion.

2. A loading dock shelter as defined in claim 1, and in which each of said side pads comprises a cover of fabric or material.

3. A loading dock shelter as defined in claim 2, and in which each of said side pads is substantially L-shaped in transverse cross section.

4. A loading dock shelter as defined in claim 3, and in which each of said side pads includes a plurality of flaps of wear-resistant, flexible material attached to said fabric of said cover on the side of said body portion thereof remote from the wall, and the side of said leg portion thereof remote from the wall, said flaps being arranged in overlapping relation to each other longitudinally of said side pad, and being secured to said fabric only along their respective upper edge portions.

5. A loading dock shelter as defined in claim 2 further including reinforcing means mechanically connecting said cover material on said side pads together for maintaining the shape of the said side pads.

6. A loading dock shelter as defined in claim 5 wherein said reinforcing means intersects said side pads at the junction between said high density and said low density resilient material.

7. A loading dock shelter for attachment to a wall having a doorway therein, comprising:
   a head pad for extending along the top of the doorway in the wall,
   two side pads for extending along the respective lateral sides of the doorway, and
   means for supporting said head pad and said side pads on the wall in outwardly projecting relation thereto in position to be operatively engaged by the top and sides of the rear of a truck backed into loading or unloading position relatively to said doorway in the wall, each of said side pads comprising an elongated body portion having upper and lower ends with said body portion adapted to extend upwardly and downwardly on the wall along one of the lateral sides of the doorway and an elongated leg portion extending along the length of said body portion in position adapted to be disposed outwardly from the doorway, said elongated leg portion integral with said elongated body portion and projecting inwardly toward the other of said side pads and adapted to extend across a portion of said doorway and at least two stabilizing wedges attached to said elongated body portion and said elongated leg portion, with each of said wedges positioned at the upper and lower ends of said side pads to retain and position said leg portion toward the other of said side pads across a portion of said doorway, and a core of compressible resilient material positioned in each of said side pads, a cover of fabric material disposed in covering relation to the front and lateral side portions of said core of compressible resilient material and reinforcing means mechanically connecting said cover on said side pads for maintaining the shape of said side pads.

8. A loading dock shelter as defined in claim 7 wherein said core of compressible resilient material in said elongated body portion is of a density greater than the density of said core of compressible material in said elongated leg portion.

9. A loading dock shelter as defined in claim 8, and in which said elongated leg portion of each of said side pads projects from the portion of said body portion of said pad which is substantially the most remote portion thereof from the wall when said side pad is disposed in operative position on said wall.

10. A loading dock shelter as defined in claim 9, and in which said leg portion of each of said side pads is substantially straight in the normal at-rest position thereof.

11. A loading dock shelter as defined in claim 10, and in which said leg portions of said side pads are disposed in substantially uniplanar relation to each other when said side pads are disposed in operative position on the wall with said legs disposed in normal at-rest position.

12. A loading dock shelter as defined in claim 9, and in which each of said side pads includes a plurality of flaps of wear-resistant, flexible material attached to said fabric of said cover thereof on the sides of said body portion and said leg portion thereof remote from such a wall when said side pad is disposed in normal at-rest position, said flaps being disposed in overlapping relation to each other in a row extending longitudinally of said side pad with the upper of adjacent flaps being disposed in overlying relation to the lower of said adjacent flaps, and being secured to said fabric of said pad only along their respective upper edge portions.

13. A loading dock shelter as defined in claim 7 wherein said reinforcing means intersects said side pads at the junction between said high density and said low density resilient material.

* * * * *